United States Patent
Pedersen et al.

(10) Patent No.: US 10,273,941 B2
(45) Date of Patent: Apr. 30, 2019

(54) ROTOR HUB FOR A WIND TURBINE

(71) Applicant: SIEMENS AKTIENGESELLSCHAFT, München (DE)

(72) Inventors: Bo Pedersen, Lemvig (DK); Kim Thomsen, Ikast (DK)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 342 days.

(21) Appl. No.: 14/688,152

(22) Filed: Apr. 16, 2015

(65) Prior Publication Data
US 2015/0345464 A1 Dec. 3, 2015

(30) Foreign Application Priority Data
May 28, 2014 (EP) .................................. 14170286

(51) Int. Cl.
*F03D 11/04* (2006.01)
*F03D 80/50* (2016.01)
*F03D 1/06* (2006.01)

(52) U.S. Cl.
CPC ............ *F03D 80/50* (2016.05); *F03D 1/0691* (2013.01); F05B 2230/61 (2013.01); F05B 2240/53 (2013.01); F05B 2240/916 (2013.01); F05B 2260/02 (2013.01); Y02E 10/721 (2013.01); Y02E 10/728 (2013.01); Y02P 70/523 (2015.11)

(58) Field of Classification Search
CPC .......... F03D 1/005; F03D 13/10; F03D 13/40; F03D 80/50; F03D 80/70; F03D 80/88; F03D 1/0691; F05B 2240/916; F05B 2240/50; F05B 2230/61; F05B 2230/80; B66C 1/108; B66C 23/207
See application file for complete search history.

(56) References Cited

U.S. PATENT DOCUMENTS

| | | | |
|---|---|---|---|
| 7,431,567 B1 * | 10/2008 | Bevington | C08F 10/00 416/244 R |
| 2006/0196288 A1 | 9/2006 | Aust et al. | |
| 2011/0211955 A1 * | 9/2011 | Eriksen | F03D 80/50 416/9 |
| 2014/0003943 A1 * | 1/2014 | Valero Lafuente | F03D 1/003 416/146 R |

FOREIGN PATENT DOCUMENTS

| | | |
|---|---|---|
| CN | 202220665 U | 5/2012 |
| EP | 2 363 598 A1 | 9/2011 |

(Continued)

OTHER PUBLICATIONS

Extended European Search Report for Application No. 14170286.0, dated Oct. 31, 2014.

(Continued)

*Primary Examiner* — Woody A Lee, Jr.
*Assistant Examiner* — Jason A Fountain
(74) *Attorney, Agent, or Firm* — Schmeiser, Olsen & Watts LLP

(57) ABSTRACT

A rotor hub for a wind turbine, comprising a first device for lifting and/or transporting being arranged in a first interior of the rotor hub is provided. Further a wind turbine comprising the rotor hub is suggested. The rotor hub is applicable for all kinds of wind turbines.

12 Claims, 4 Drawing Sheets

(56) References Cited

FOREIGN PATENT DOCUMENTS

| | | |
|---|---|---|
| EP | 2369174 A1 | 9/2011 |
| EP | 2505822 A1 | 10/2012 |
| EP | 2607694 A1 | 6/2013 |
| EP | 2626577 A1 | 8/2013 |
| EP | 2657519 A1 | 10/2013 |
| EP | 2711568 A1 | 3/2014 |
| WO | WO 2013034389 A2 | 3/2013 |
| WO | WO 2013034390 A1 | 3/2013 |
| WO | WO 2013034391 A2 | 3/2013 |
| WO | WO 2013080392 A1 | 6/2013 |
| WO | WO 2014020637 A1 | 2/2014 |

OTHER PUBLICATIONS

European Office Action for EP Application No. 14 170 286.0, dated May 18, 2018.

* cited by examiner

ROTOR HUB FOR A WIND TURBINE

CROSS-REFERENCE TO RELATED APPLICATIONS

This application claims priority to EP Application No. EP14170286.0, having a filing date of May 28, 2014, the entire contents of which are hereby incorporated by reference.

FIELD OF TECHNOLOGY

The following relates to a rotor hub and a wind turbine comprising a rotor hub.

BACKGROUND

Alternative energy sources have become much more necessary as fossil fuels are depleted and pollute the environment. Wind energy is one of the most cost effective of all types of renewable energy. However, to make wind a viable source of energy or electricity in particular careful design of wind-capturing machines is necessary. A variety of principles of physics are used to create wind turbines that can efficiently capture energy from the wind. Wind turbines can be onshore or offshore.

With the increasing significance of wind power the size and dimension of the wind turbines is also increasing. As a consequence, huge effort, logistically and economically, is necessary, e.g., for service and maintenance of such wind turbines. Heavy components in a wind turbine such as yaw motors, hydraulic or brake components in a wind turbine, etc. are typically handled or replaced due to, e.g., malfunction or age. Therefore, external cranes and hoist mechanisms are used when a wind turbine is undergoing a service inspection or repair.

EP 2 363 598 A1 relates to a wind turbine comprising a nacelle being rotatable disposed on a tower with the nacelle having a first cavity, a generator housing portion disposed upstream to the nacelle having a second cavity, a hub disposed upstream to the generator housing portion with attached rotor blades at it having a third cavity, whereby the first, second and third cavities communicate with one another. Further, the wind turbine comprises a railway system comprising at least one rail-element having a means for lifting and/or transporting being movable along the rail-system, wherein the rail-system at least partially extends through at least two adjacent cavities.

Due to their large size and/or bulky properties, the use of aforementioned cranes and hoist mechanism is complicated and not efficient.

SUMMARY

An aspect relates to improving the approach for a wind turbine to ensure effective maintenance and serviceability.

This problem is solved according to the features of the independent claims. Further embodiments result from the depending claims.

In order to overcome this problem, a rotor hub for a wind turbine is provided, comprising first means for lifting and/or transporting being arranged in a first interior of the rotor hub.

The proposed solution takes the advantage of the increasing dimensions of the wind turbines by using available space for serviceability, maintenance, rework and/or re-furbishment of any parts of the wind turbine where replacement and renewal is possible. Advantageously, the proposed solution allows a technician handling the parts of the wind turbine, in particular parts of the rotor hub, without lifting heavy weights, by fixing the parts during, e.g., service or maintenance activities to the means for lifting and/or transporting, enabling freely handling of the parts within the interior or the rotor hub.

In an embodiment, the rotor hub comprises a rotatable part and the means for lifting and/or transporting being attached to the rotatable part.

The rotatable part may be a shell or housing of the rotor hub or parts of the shell or housing. Preferable, the means for lifting and/or transporting is attached or mounted at the inner surface of the rotatable part.

Turning the rotor hub, i.e. the rotatable part of the rotor hub together with the means for lifting and/or transporting in a proper angular position allows a comfortable handling of parts within the interior of the rotor hub.

In another embodiment, the means for lifting and/or transporting comprises at least one hoist beam. The hoist beam can be any kind of hoist mechanism, enabling lifting or lowering of parts or weights.

In a further embodiment, the means or first device for lifting and/or transporting comprises a rail-system being attached to the rotatable part. The means or first device for lifting and/or transporting may also be referred as a first lifter and/or transporter. The rail-system allows a bigger freedom, i.e. more flexibility for handling parts within the interior of the rotor hub.

In a next embodiment, the at least one hoist beam is moveably attached to the rail-system. The hoist beam may be detachably attached to the rail-system.

It is also an embodiment that the means for lifting and/or transporting comprises at least one crane. The at least one crane may be attached to the rail-system wherein the crane may be detachably attached to the rail-system. The at least one crane may be attached to the rail-system in addition to the at least one hoist beam.

The at least one crane may be arranged within the interior of the rotor hub without any rail-system, e.g., being mounted on a fixed part (like a stationary shaft) of the wind turbine.

The problem stated above is also solved by a wind turbine comprising a rotor hub as described herein.

Pursuant to another embodiment, the rotor hub is rotatable mounted at a frame of the wind turbine, the frame comprises a second interior and the first means for lifting and transporting is communicating with the second interior via at least one manhole being part of the frame.

According to an embodiment, a second means or second device for lifting and/or transporting is arranged in the second interior, the first means for lifting and/or transporting and the second means for lifting and/or transporting are communicating with each other via the at least one manhole. The second means or second device for lifting and/or transporting may also be referred to a second lifter and/or transporter.

According to another embodiment, the second means for lifting and/or transporting comprises a second rail-system.

In yet another embodiment, the second means for lifting and/or transporting comprises at least one hoist beam being attached to the second rail-system.

According to a next embodiment, the second means for lifting and/or transportation comprises at least one cart being moveable along the second rail-system.

The at least one cart maybe used without the second rail system, thereby, e.g., being directly moved on a bottom within the interior of the frame.

The at least one cart can be any kind of vehicle which allows the loading of one or several parts or objects and which supports the transfer or transport of the parts along the rail system within the second interior.

Pursuant to yet an embodiment, the frame comprises a hollow shaft, the second interior is part of the hollow shaft.

According to a further embodiment, the rotor hub is rotatably mounted on the frame via at least one bearing, the at least one bearing is a fluid bearing or a tapered bearing comprising at least one sliding surface.

Pursuant to a next embodiment, the wind turbine comprises a positioning means allowing a stepwise positioning of the rotor hub in order to achieve an appropriate positioning of the first means for lifting and/or transporting within the first interior of the rotor hub.

BRIEF DESCRIPTION

Some of the embodiments will be described in detail, with reference to the following figures, wherein like designations denote like members, wherein.

DETAILED DESCRIPTION

Figure 1:
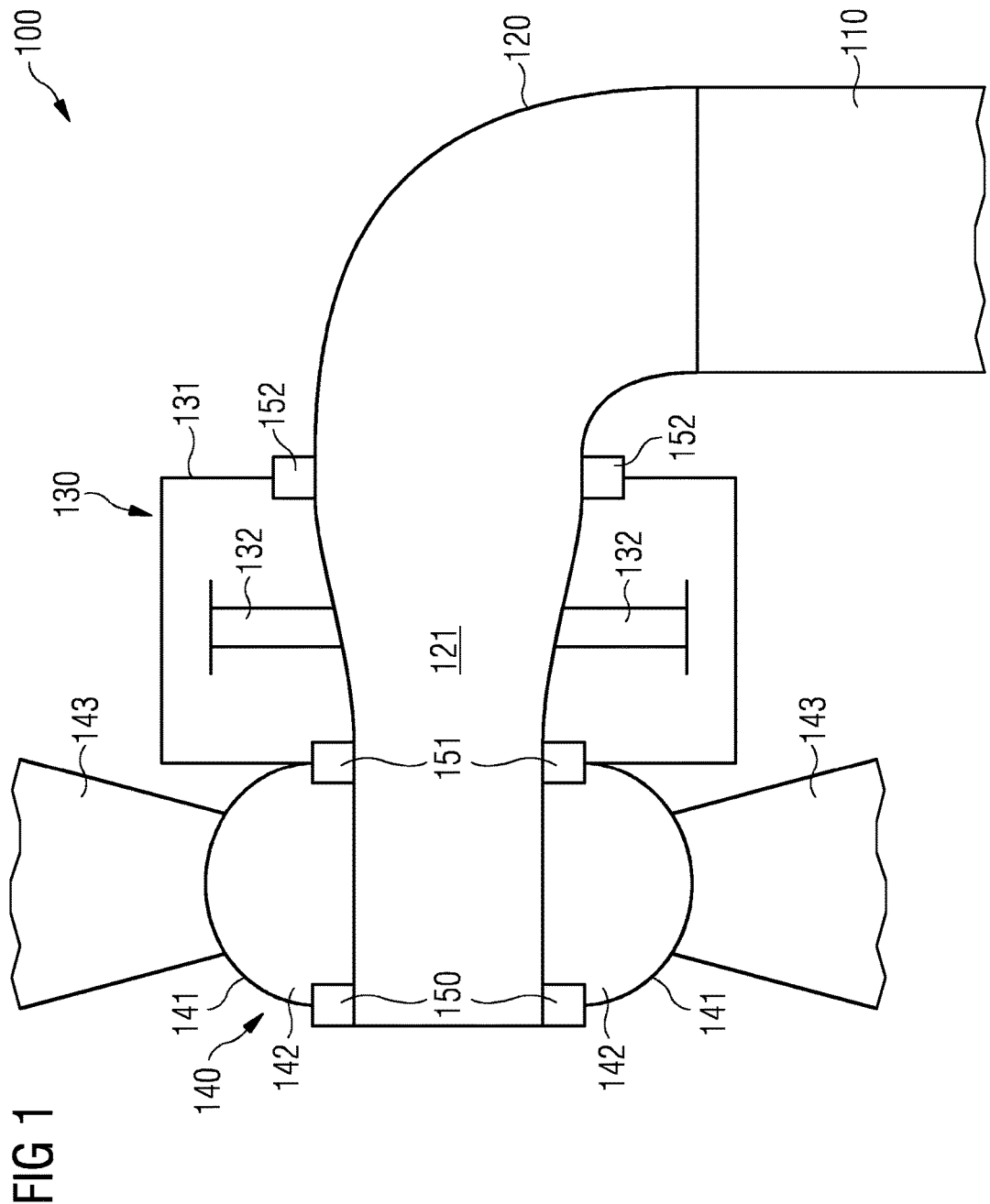
FIG. 1 shows an exemplarily schematic overview of a wind turbine.

With reference to FIG. 1 an exemplary schematic overview of a wind turbine 100 is shown by a longitudinal cut. The wind turbine 100 comprises a tower 110 and a frame or shaft 120 which is rotatable mounted on top of the tower 110. An exemplary embodiment of the frame or shaft 120, defining an interior 121, is a stationary hollow shaft. A rotor hub 140 is rotatably mounted on the upwind side of the frame or shaft 120 through a front bearing 150 and a back bearing 151. The rotor hub 140 is adapted to be connected to a plurality of rotor blades 143.

The rotor hub 140 comprises a housing or shell 141 defining an interior 142. Further, a generator 130 is mounted on the shaft 120 via the back bearing 151 and a support bearing 152. A rotatable part 131 of the generator 130, which is also referred to as generator rotor, is connected to the shell 141 of the rotor hub 140 via the back bearing 151.

The wind turbine 100 can be, e.g., a direct drive wind turbine.

According to conventional wind turbine designs the front bearing 150 and the back bearing 151 is a roller bearing or ball bearing which requires external crane capacity if such a bearing 150, 151 needs replacement. This type of service is associated with costs, especially for wind turbines located offshore.

According to an advanced design of the wind turbine, enabling an appropriate use of the proposed solution, suitable fluid bearings may be employed, particularly hydrodynamic, hydrostatic or hybrid bearings, based on the hydrodynamic and/or hydrostatic principal for generating a pressure build-up, lifting and separating rotating components from a stationary part of a wind turbine structure. Exemplary components of the bearings are tilting pads and/or fixed profile pads or/and pads supported by other means allowing geometry change/adaption (like, e.g., hydraulic support, spring beds or flexure support).

Each of the bearings 150, 151 is capable of handling radial loads as well as thrust emerging towards both axial directions.

The support bearing 152 is adapted to carry limited loads compared to the loads carried by the bearings 150, 151. The support bearing 152 ensures maintenance of a permanent air gap between the generator rotor 131 and a stationary part 132 of the generator 130 which is also referred to as generator stator.

A flexible housing or shell of the generator rotor 131 may avoid the development of significant internal forces due to possible over constraints of the arrangement of the bearings 150, 151, 152.

Figure 2:
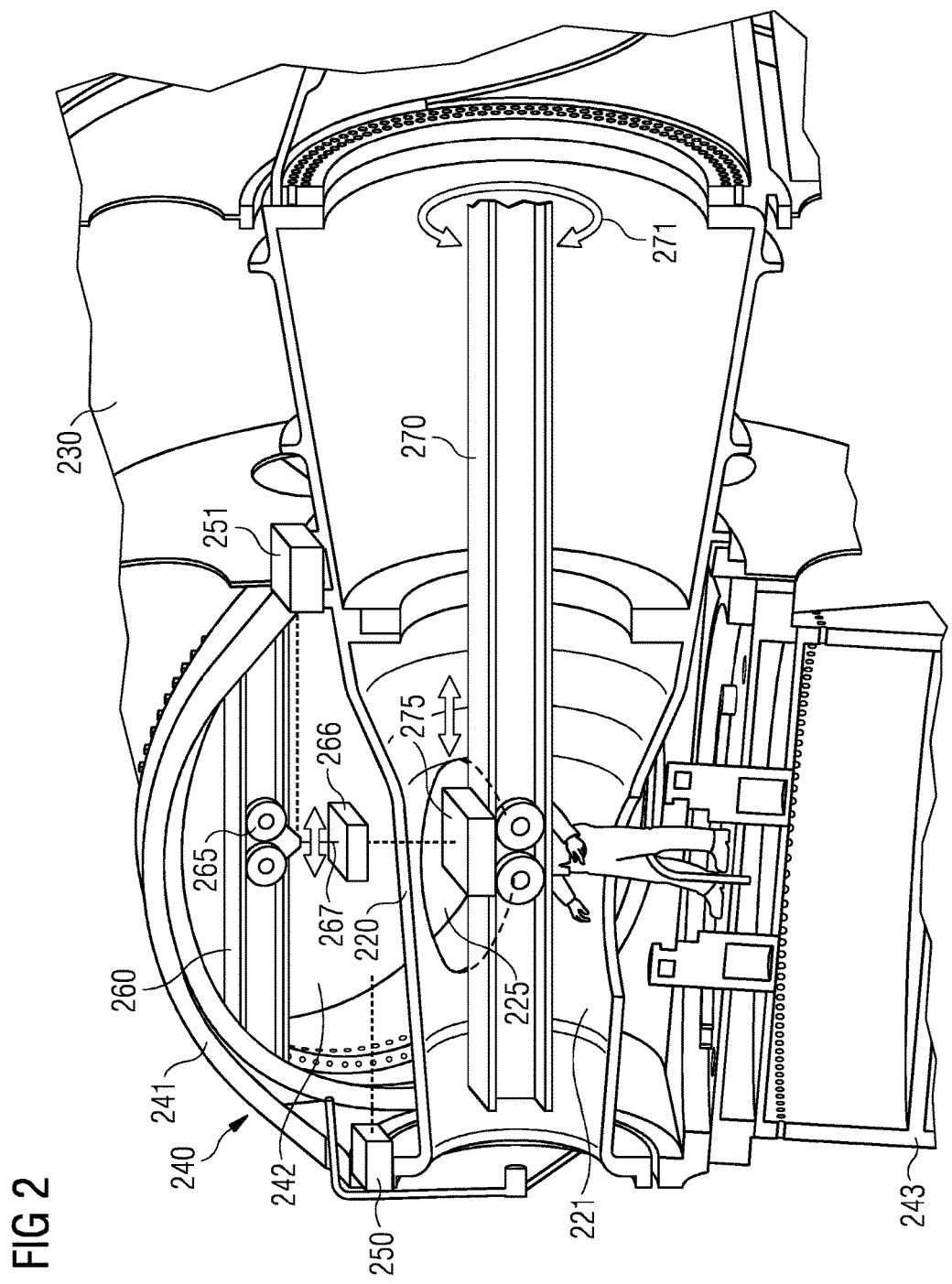
FIG. 2 illustrates a more detailed schematic view of a section at the upwind side of the wind turbine according to FIG. 1.

FIG. 2 illustrates a more detailed schematically view of a section at the upwind side of the frame or shaft 120 according to FIG. 1 thereby showing an exemplary embodiment of the proposed solution.

A shell 241 of a rotatable part of a rotor hub 240 is mounted at the upwind side of a frame 220 of a wind turbine via a front bearing 250 and a back bearing 251. The frame 220, like, e.g., a stationary hollow shaft, comprises a manhole 225 for maintenance and service activities. The shell 241, defining an interior 242 of the rotor hub 240, is connected to a housing of a generator 230 via the back bearing 251. The housing of the generator 230 can be, e.g., a part of a generator rotor.

According to the exemplary embodiment as shown in FIG. 2, the front bearing 250 and the back bearing 251 are designed as fluid bearings or tapered bearings, comprising a least one conical shaped sliding surface. The benefit of using fluid or tapered bearings is that at least one part of the bearing (also referred to as bearing part) like, e.g., at least one part of a sliding pair can be taken out or can be extracted and replaced, e.g., during maintenance and service activities without disassembling a drive train and/or a complete rotor-plane (i.e. the rotor hub 240 together with the rotor blades 243).

FIG. 2 exemplarily shows a section of a direct-drive wind turbine having a direct mechanical coupling between the rotor hub 240 and the generator 230. Consequently, rotor blades 243 mounted at the rotor hub 240 and the generator rotor are driven by the wind as a unit.

According to a first embodiment of the proposed solution, a rail-system 260 is adjusted in the interior 242 of the rotor hub 240 in such a way that the rail-system 260 is a fixed component of the rotatable part of the rotor hub 240.

Several ways may be possible mounting the rail-system 260 within the interior 242 of the rotor hub 240 to be a fixed component or an element of the rotatable part of the rotor hub 240. Alternatively, the rail-system 260 may also be detachably mounted to the rotatable part of the rotor hub 240.

Further, a first means for lifting and/or transporting or a first lifter and/or transporter is detachably attached to the rail-system 260. One embodiment of the first means for lifting and/or transporting comprises a rotatable hoist beam 265 being moveable along the rail-system 260 within the interior 242 of the rotor hub 240 in both directions. The hoist beam 265 and the rail-system 260, defining together a functional unit, may be also referred to as the first means for lifting and/or transporting.

Usually, the hoist beam 265 comprises a special fixture 267 for mounting parts to be transferred (i.e. to be lifted, lowered and/or transported) to the hoist beam 265 and for handling the parts within the interior 242 of the rotor hub 240.

According to an alternative embodiment the means for lifting and/or transporting comprises a small crane, e.g., with a properly dimensioned arm enabling several degrees of freedom to operate within the interior 242 of the rotor hub 240. Thereby, the crane may be attached to the rail-system 260 being moveable with the interior 242.

Alternatively, the crane may be directly mounted to the rotatable part of the rotor hub 240, thereby defining a fixed component or element of the rotatable part of the rotor hub 240.

The rotatable part can be, e.g., the shell or housing of the rotor hub 240. Also at least one reinforcement plate, e.g., of a blade bearing can be a fixed component or element of the rotatable part of the rotor hub 240.

According to a further possible embodiment, the crane may be directly mounted to a stationary part of the wind turbine, like, e.g., the stationary shaft 220 within the interior 242 of the rotor hub 240.

Figure 3:
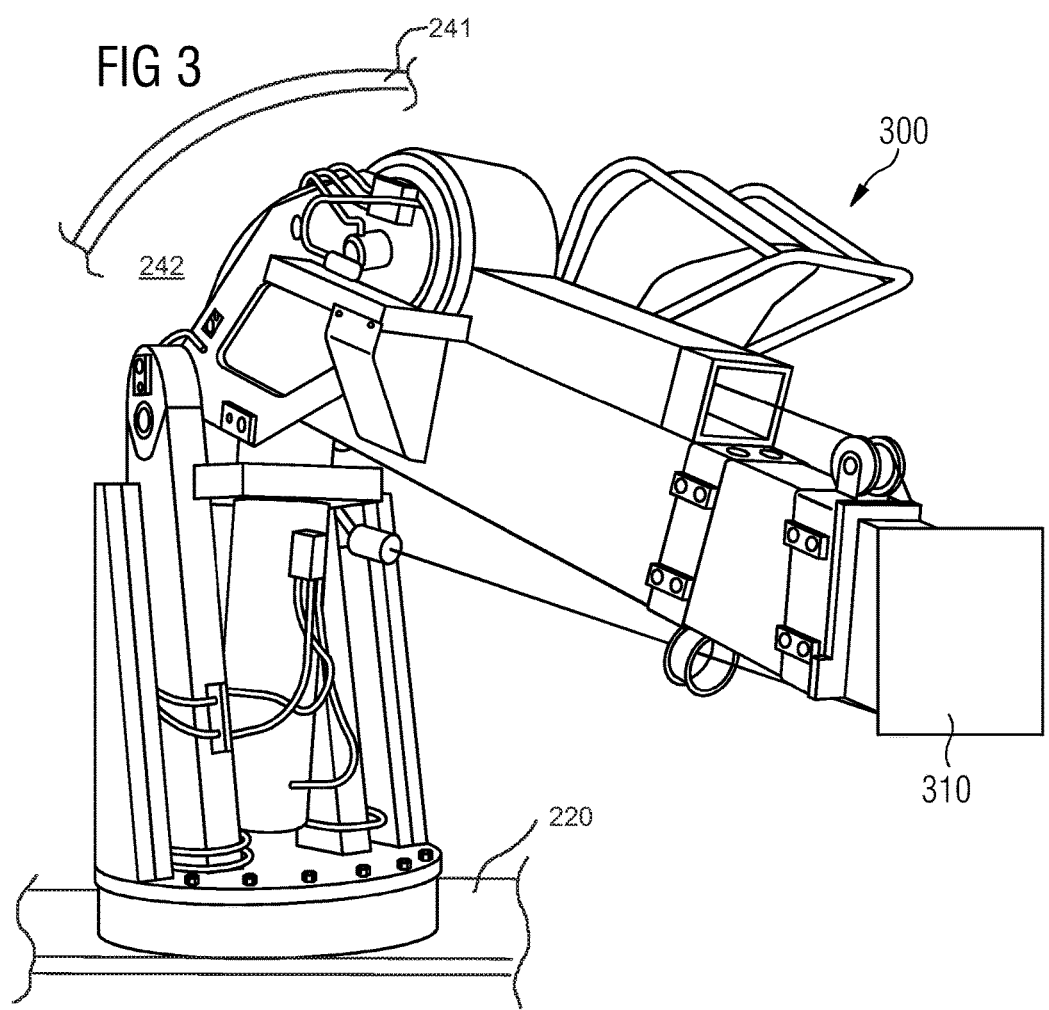
FIG. 3 shows a schematic view of an example of a small crane.

FIG. 3 shows a schematic view of an example of a crane 300. A box 310 represents a special fixture enabling the mounting and handling of bearing parts (not shown) within the interior of a rotor hub. Accordingly, after turning the rotor hub into a proper position, the crane 300 can be positioned by a crane operator in such a way (not shown), that the relevant bearing part mounted onto the special fixture, can be transferred through the manhole 225 to the interior 221 of the shaft 220.

Applying the proposed solution as shown in FIG. 2, e.g., one part or several parts of the front and/or back bearing 250, 251 (also referred to as bearing parts) can be exchanged or replaced during maintenance or service activities. Thereby, after disassembling, the bearing parts (e.g. liner, sliding material, back pads, pivot points, etc.) to be replaced can be extracted and transported (by using e.g. special equipment or further cranes, not shown) to the possible range of activity of the hoist beam 265 in order to use the hoist beam 265 for further lifting or lowering and transport of the bearing parts.

FIG. 2 exemplarily shows an extracted bearing part 266 mounted by the special fixture 267 to the hoist beam 265 being transferred through the manhole 225 into the interior 212 of the hollow shaft 220. One or more appropriate (new) parts (not shown), replacing the extracted bearing part 266 will be handled according to the reverse direction, i.e. transferred towards the bearing 250, 251.

The proposed solution allows an advantageous, i.e. simplified, performance of service or maintenance activities, like, e.g., exchanging bearing parts by rotating the rotor hub 240 stepwise in such a way, that the respective bearing part to be exchanged, the rail-system 260 and the hoist beam 265 are in the correct position to communicate with each other and in particular to be aligned to enable proper hoisting of the bearing part. This can be applied sequentially to all parts of the bearings 250, 251, to be exchanged or replaced.

To allow stepwise positioning, the rotor plane, i.e. the rotor hub 240 together with the rotor blades 243, can be rotated stepwise, e.g. by applying special equipment used during initial assembly of the rotor blades. Alternatively, other equipment, like, e.g., turner equipment, can be used allowing rotation of the rotor hub 240. Stepwise positioning, e.g., can be applied for all single pads of the bearings 250, 251 until all bearing parts are replaced.

Figure 4:
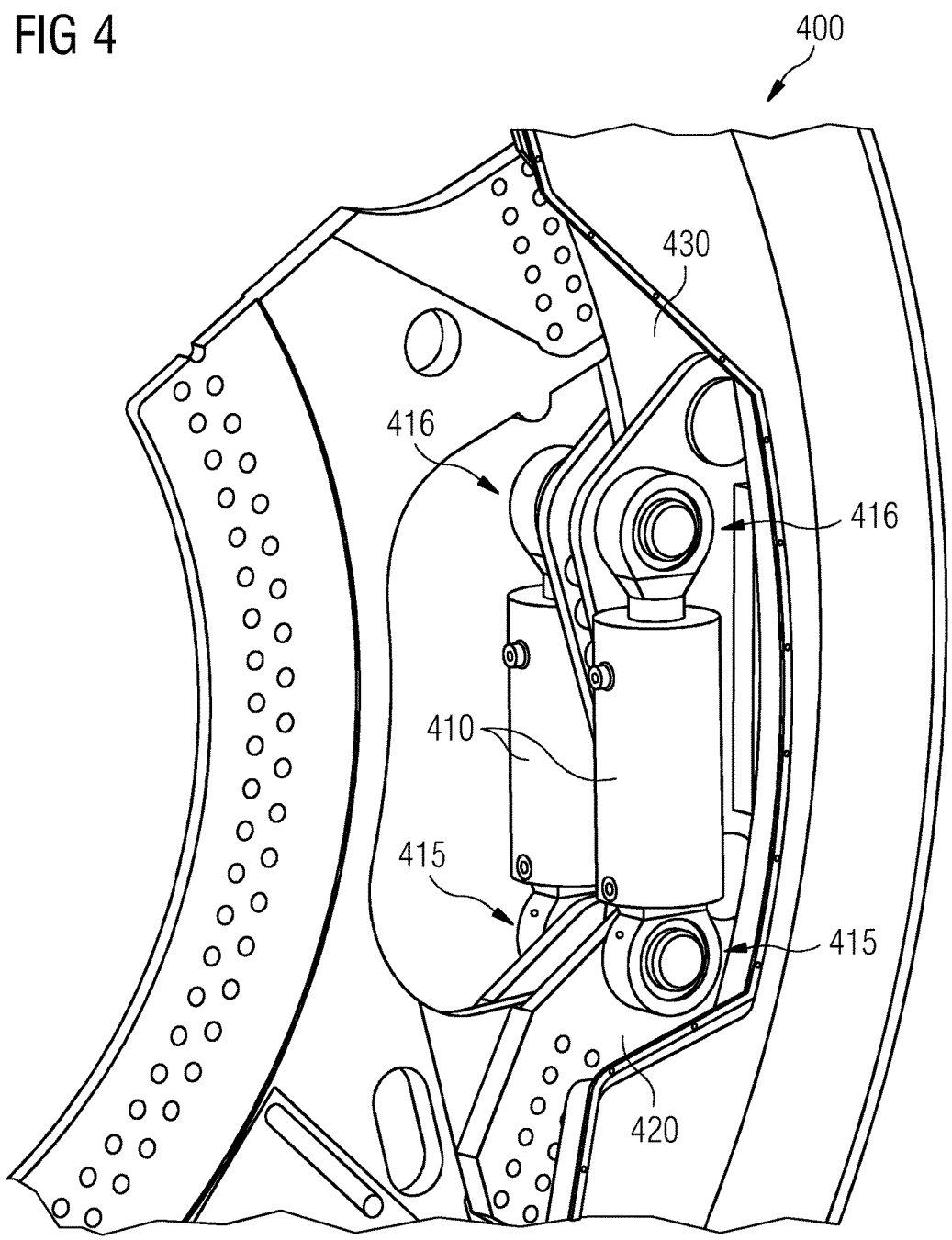
FIG. 4 shows in a schematic view an example of turner equipment allowing a stepwise positioning of the rotor hub.

FIG. 4 shows in a schematic view an exemplary embodiment of a component of a turner equipment 400 mounted, e.g., on a back end of a generator (not visible). The turner equipment 400 comprises two hydraulic turner cylinders 410. A first side 415 of each of the turner cylinders 410 is attached to a stationary part 420 (like, e.g. a fixed shaft) of a wind turbine. A second side 416 of each of the turner cylinders 410 is attached, e.g., to a break disk of a wind turbine or a rotor disk 430 of the generator. The turner equipment 400 may be used for a stepwise rotation of the generator and a rotor hub during installation of single rotor blades and will be detached after finalization of the installation. The same equipment 400 may be reused at a later time, e.g., during maintenance and service activities.

According to an advanced embodiment of the proposed solution, a further rail-system 270 is stationary adjusted in the interior 221 of the hollow shaft 220. A further or second means for lifting and/or transporting 275, which may also be referred to as the lifter and/or transporter, is detachable attached to the rail-system 270. According to the embodiment of FIG. 2, the second means for lifting and/or transporting 275 comprises a cart with, e.g., one or more pair of wheels enabling the movement of the cart 275 within the interior 221, i.e. the movement of the cart 275 along the rail-system 270 in both directions between the upwind side and the downwind side of the shaft 220.

Alternatively or in addition to that, the second means for lifting and/or transporting 275 may comprise a rotatable hoist beam or a small crane (not shown).

As illustrated in FIG. 2, the bearing part 266 being fixed to the hoist beam 265 can be hoisted or transferred through the manhole 225 of the shaft 220 to be unloaded on the cart 275, which can be moved in a proper position on the rail-system 270 to enable proper unloading and further transport of the bearing part 266. After unloading, the cart 275, loaded with the bearing part 266, can be moved along the rail-system 270 to one end of the hollow shaft 220 to allow further unloading of the bearing part 266 through an opening (not shown) onto an external crane outside of the wind turbine 100 hoisting the bearing part 266 to the bottom of the ground.

According to a further embodiment, the rail-system 270 including a rail which may be rotatably adjusted within the interior of the hollow shaft 220. Turning the rail of the rail-system clockwise or counterclockwise around its longitudinal axis (illustrated by a double arrow 271 in FIG. 2) allows an improved positioning, e.g., of the cart 275 and therefore allows a more comfortable loading or unloading of the bearing part 266.

The following steps describe an exemplary exchange procedure or method for bearing parts, mounted, e.g., on a non-rotatable part (like the fixed shaft 220) of the wind turbine 100. As an advantage, the method is applicable for all parts of the bearing, i.e. at any angle or at any circumferential position of the relevant bearing part.

Turning rotor hub 240 in such a way, that the hoist beam 265 is in the same angular position as the bearing part 266 to be exchanged.

Mounting the fixture 267 of the hoist beam 265 at the bearing part 266 and, after fixing, dismantling the bearing part 266 such that the weight of the bearing part 266 is carried by the hoist beam 265.

Turning the rotor hub 240 in the same angular position as the manhole 225 located at the shaft 220. By turning the rotor hub 240 also the hoist beam 265 together with the fixed bearing part 266 will be turned to the required position.

Transferring the bearing part 266 through the manhole 225 towards the cart 275 within the interior 221 of the shaft 220. The transfer can be either by lowering the bearing part 266 through the manhole 225 toward the cart 275 in case the actual position of the manhole 225 is upward to the cart 275, or by lifting the bearing part 266 through the manhole 225 towards the cart 275 in case the actual position of the manhole 225 is at the bottom of the shaft 220.

Unloading the bearing part 266 to the cart 275 and moving the cart 275 together with the bearing part 266 along the rail-system 270.

transferring the bearing part 266 to the bottom of the tower by using, e.g., an external crane, like a nacelle crane. The transfer may by external or inside of the tower.

Usually, the bearing parts 266 do have significant weight, being too much than can be handled by hand by technicians during service or maintenance activities. Applying the proposed solution, all bearing parts, to be exchanged or replaced, can be proper handled by using the hoist beam 265 together with the special fixture 267 carrying the weight when dismounting the bearings 250, 251.

The proposed solution takes the advantage of the increasing dimensions of the wind turbines by using available space within the wind turbine for serviceability, maintenance, rework and/or refurbishment of any parts of the wind turbine where replacement and renewal is possible.

As an advantage, all activities necessary for replacement and refurbishment can be executed inside of the wind turbine without using, e.g., an external crane for demounting the rotor plane and the fixed shaft.

One or more sections, e.g., of the bearings or a bearing part may be under load when the turbine is stationary. Thus, a system may be required enabling the unloading of the relevant part during inspection, service or replacement activities. As an exemplary solution, jack up systems may be applied, partially lifting the weight of the rotor hub or a bearing support and allowing unloading of the particular bearing section or bearing part and/or optionally distributing the weight to neighboring sections.

Although the invention is described in detail by the embodiments above, it is noted that the invention is not at all limited to such embodiments. In particular, alternatives can be derived by a person skilled in the art from the exemplary embodiments and the illustrations without exceeding the scope of this invention.

The invention claimed is:

1. A rotor hub for a wind turbine, comprising:
   a first lifter and/or transporter being arranged in a first interior of the rotor hub, wherein the rotor hub comprises a rotatable part, the first lifter and/or transporter being attached to the rotatable part for rotation therewith, the first lifter and/or transporter comprises a first rail-system being attached to the rotatable part; and
   a frame, wherein the rotor hub is rotatably mounted at the frame of the wind turbine, the frame includes a second interior,
   a second lifter and/or transporter being arranged in the second interior, wherein the second lifter and/or transporter being attached to the second interior for rotatable adjustment therewith, wherein said second lifter/transporter includes a second rail-system having a rail with a longitudinal axis, said rail being rotatable clockwise or counterclockwise around the longitudinal axis for rotation of the rail system.

2. The rotor hub according to claim 1, wherein first lifter and/or transporter comprises at least one hoist beam.

3. The rotor hub according to claim 2, wherein the at least one hoist beam is moveable attached to the first rail-system.

4. The rotor hub according to claim 1, wherein first lifter and/or transporter comprises at least one crane.

5. A wind turbine, comprising a rotor hub according to claim 1.

6. The wind turbine according to claim 5, wherein the first lifter and/or transporter is communicating with the second interior via at least one manhole being part of the frame.

7. The wind turbine according to claim 6, wherein the first lifter and/or transporter and the second lifter and/or transporter are communicating with each other via the at least one manhole.

8. The wind turbine according to claim 1, wherein the second rail-system comprises at least one hoist beam being attached to the second rail-system.

9. The wind turbine according to claim 1, wherein the second lifter and/or transporter comprises at least one cart being moveable along the second rail-system.

10. The wind turbine according to claim 6, wherein the frame comprises a hollow shaft, the second interior is part of the hollow shaft.

11. The wind turbine according to claim 6, wherein the rotor hub is rotatably mounted on the frame via at least one bearing, the at least one bearing is a fluid bearing or a tapered bearing comprising at least one sliding surface.

12. The wind turbine according to claim 6, wherein the wind turbine comprises a positioning device allowing a stepwise positioning of the rotor hub in order to achieve an appropriate positioning of the first lifter and/or transporter the first interior of the rotor hub.

* * * * *